April 8, 1969  H. R. WILSON  3,437,184
METHOD OF NEUTRALIZING TRANSMISSION AND BRAKING VEHICLE
WHEN SHIFTING BETWEEN FORWARD AND REVERSE
Filed May 29, 1967
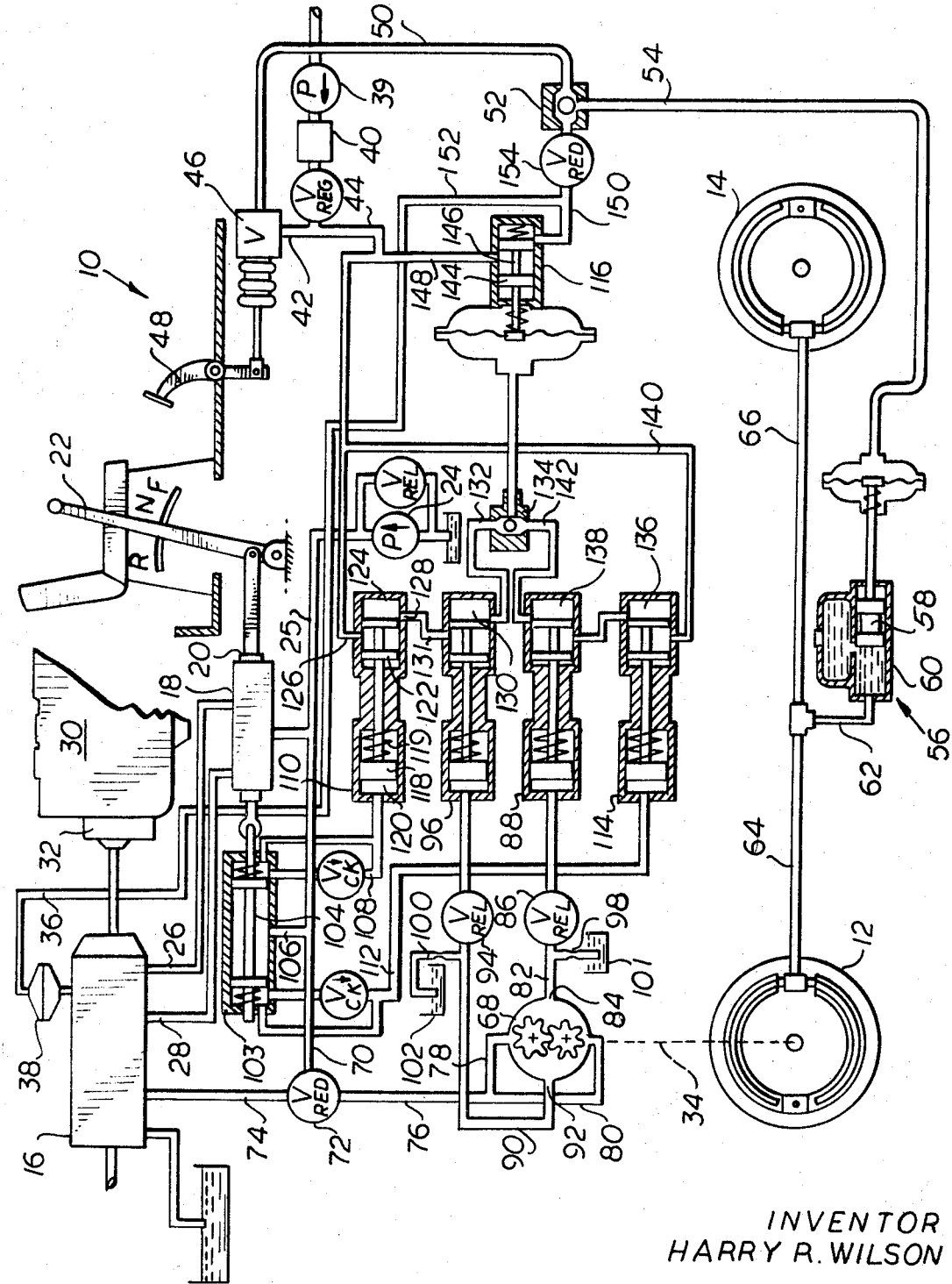
INVENTOR
HARRY R. WILSON
Richard E. Barkun
ATT Y Patented Apr. 8, 1969

3,437,184
METHOD OF NEUTRALIZING TRANSMISSION AND BRAKING VEHICLE WHEN SHIFTING BETWEEN FORWARD AND REVERSE
Harry R. Wilson, Libertyville, Ill., assignor to International Harvester Company, Chicago, Ill., a corporation of Delaware
Filed May 29, 1967, Ser. No. 641,872
Int. Cl. F16d 41/24, 67/00; F16h 57/10
U.S. Cl. 192—4       5 Claims

ABSTRACT OF THE DISCLOSURE

A method of operation in which control signals are produced responsive to both forward and reverse transmission shift conditions and to forward and reverse vehicle movement. Vehicle brake means and transmission disconnect means are operated responsive to the control signals whenever the transmission is operated to a shift condition opposite to that of the direction of vehicle movement.

Background of the invention

This invention pertains to a method of operating a control system for a vehicle employing an engine driven transmission capable of being shifted into a condition opposite from that in which the vehicle is moving. In heavy construction vehicles, for example, a typical cycle of operation at a construction site involves several changes of direction. Oftentimes the operator is preoccupied with the loader or dozer blade controls and will hurriedly shift the transmission for operation in a direction opposite to that of vehicle movement before bringing the vehicle to a complete stop. This imposes severe shifting shocks on the drive train while also producing excess heat in the transmission clutches, which in turn adversely affects clutch life. On the other hand, if the operator were to concentrate on bringing the vehicle to a dead stop before he operates the shift controls, then his attention would be diverted from the operation of other controls on the vehicle.

One example in the prior art of an attempt to solve the foregoing problems is presented by the patent to Codlin No. 2,904,146. In the Codlin control system the tractor transmission is shifted into neutral when the brakes are applied. An override control is provided to selectively make the automatic shift either operable or inoperable. However, this system is not satisfactory since the operator has an additional control to manipulate when he desires to brake the vehicle without disengaging the transmission.

Another prior art solution is presented in the patent to Hunsaker et al. No. 3,169,616. The Hunsaker device includes a mechanical lock directly preventing operation of the shift lever whenever the lever is moved to the neutral position. The lock is released whenever the brake pressure builds up to a predetermined value. This device is undesirable since the operator must not only independently manipulate the brake control but also must complete the shift to the transmission condition desired after the vehicle has been brought to a stop by the brakes.

Summary of the invention

This invention relates to a method of operating an automatic transmission and brake control system for a vehicle. A principal object is to preclude shifting of the transmission while the vehicle is moving in a direction opposite to that of the intended shift, thus eliminating shifting shock in the vehicle drive train while reducing heat generation in the transmission clutches to achieve longer clutch life. It is an object of the invention to provide a method for controlling the vehicle in which both directional movement and transmission shift conditions produce control signals which are utilized to operate the vehicle brakes and transmission disconnect mechanism. When the transmission control lever is shifted to a position opposite to that in which the vehicle is moving, vehicle movement control signals and transmission shift condition control signals are simultaneously produced. The brake means and transmission disconnect mechanism are operated responsive to these control signals so that the transmission is disconnected to the neutral condition while the brakes are applied. After the vehicle has been brought to a stop the control signals are reduced to a magnitude which effects completion of the transmission shift and brake release so that the vehicle will move in the chosen direction. Means are provided to permit the operator to override the control system and apply the brakes harder to stop the vehicle more rapidly. Thus the control system does not interfere with normal tractor operation. As the control system operates to automatically brake the vehicle the operator will be free to direct his attention to other controls on the vehicle.

Description of the drawing

The figure is a schematic diagram illustrating a preferred embodiment of a vehicle control system embodying features of the present invention.

Description of the preferred embodiment

The figure illustrates a vehicle control system 10 for automatic control of brakes 12, 14 and transmission 16 which may be found on a construction vehicle such as a tractor loader. Transmission 16 may be of a conventional friction-disc planetary gear type shifted hydraulically under influence of hydraulic control valve 18. Control valve 18 is provided with a valve spool 20 shifted between neutral, forward, and reverse positions by means of control lever 22. In the forward and reverse positions of the lever and spool fluid under pressure is directed from hydraulic pump 24 and conduit 25 through either of the conduits 26 and 28 to engage and disengage the friction disc clutches in transmission 16. Power from engine 30 and torque convertor 32 is delivered through transmission 16 to final drive train 34 and the traction wheels. In the neutral position of valve spool 20 conduits 26 and 28 are unpressurized to disengage transmission 16. The transmission may also be disengaged when air under pressure in conduit 36 is directed to the conventional disconnect device 38 on the transmission. Disconnect device 38 operates in a well-known manner to relieve hydraulic fluid pressure from the clutches even when the control valve 18 is manipulated to pressurize conduits 26 or 28.

The brake system comprises an air-over-hydraulic circuit operated either manually or else automatically by the control system 10. Air pressure for the brake circuit is supplied by air pump 39 and air reservoir 40 which feeds the branch conduits 42 and 44. Conduit 42 communicates with brake valve 46 operated by means of brake pedal 48. With pedal 48 depressed valve 46 opens to deliver air under pressure into conduit 50 and check valve 52. Check valve 52 directs the air through conduit 54 to operate a conventional power brake cluster 56. Air pressure will shift piston 58 of the brake cluster to the left forcing hydraulic fluid from cylinder 60 to flow into conduit 62 and branch conduits 64 and 66 to operate the brakes.

When the vehicle is moving in any given direction the operator may shift lever 22 so that valve spool 20 is positioned for transmission operation in a direction opposite to the given direction. Control system 10 senses when these conditions exist and functions to operate disconnect mechanism 38 simultaneously with operation of brakes 12 and 14 until the vehicle is stopped. At any other condition of vehicle operation the automatic transmission disconnect and braking will not take effect. For example, if the vehicle is standing still control lever 22 may be operated to any position without energizing the control system, and similarly, if the vehicle is moving in a given direction lever 22 may be operated to condition valve spool 20 for transmission operation in the same given direction without energizing the control system.

Control system 10 senses vehicle movement in either the forward or reverse directions preferably by means of gear pump 68. Pump 68 is conventional and may be geared for rotation with the final drive train 34 of the vehicle. The pump receives charging fluid from the transmission lubrication system consisting of conduit 70 connected with conduit 25, reduction valve 72, and branch conduit 74. A conduit 76 is connected with the valve 72 and is bifurcated into inlet conduits 78 and 80 to charge the pump. Conduit 82 connects the "forward" outlet port 84 with relief valve 86 and hydraulic servomotor 88. Similarly, conduit 90 connects "reverse" outlet port 92 with relief valve 94 and servomotor 96. A pair of restricted conduits 98 and 100 are connected with respective conduits 82 and 90 to bleed off pressure to reservoirs 101 and 102.

During forward vehicle movement pump 68 will pressurize conduit 82 to energize servomotor 88 and during reverse vehicle movement conduit 90 will be pressurized to energize servomotor 96. This pressurization of the conduits provides the forward and reverse movement control signals for the circuit. When the vehicle comes to a stop either of the conduits 98 or 100 will bleed down the pressure below a predetermined magnitude whereupon the respective servomotors will be de-energized.

Transmission shift conditions are sensed by means of a valve 103 mounted adjacent transmission control valve 18. Valve 103 is provided with a spool 104 directly connected with spool 20 of the control valve. Spool 104 is in the neutral position illustrated in the drawing when control lever 22 is in neutral. With lever 22 moved to its forward position spool 104 is moved to the right, and with lever 22 in its reverse position spool 104 is moved to the left. In its right position spool 104 provides fluid communication between conduit 106 connected with outlet conduit 25 of pump 24 and with conduit 108 leading to servomotor 110. In its left position spool 104 provides communication between conduit 106 and conduit 112 leading to servometer 114. Thus, with control level 22 in its forward position valve 103 functions to provide a forward transmission shift condition control signal consisting of pressure in conduit 108 while with lever 22 in its reverse position a reverse transmission shift condition control signal is created which consists of pressure in conduit 112. In the neutral position of lever 22 neither of the conduits 108 and 112 are pressurized.

The four servometers function to communicate air pressure from branch conduit 44 into air operated relay valve 116 which then directs pressurized air to brake cluster 56 for operation of the brakes. This occurs when either of the pairs of servomotors 96, 110 or 88, 114 are simultaneously energized.

Servomotor 110 is exemplary of the four identical servomotors and consists of a piston 118 biased by means of spring 119 to the left within chamber 120. A valve spool 122 is formed at the end of the piston and moves within valve chamber 124 to open and close fluid communication between inlet port 126 and outlet port 128. Servomotor 96 has its valve chamber 130 in series connection with valve chamber 124 by means of conduit 131. Thus, with both of the servomotors 96 and 110 energized pressurized air from branch conduit 44 will be directed through the valve chambers into conduit 132, check valve 134, and air relay valve 116. Similarly, valve chamber 136 of servomotor 114 and valve chamber 138 of servomotor 88 are in series connection so that upon simultaneous energization of the servomotors pressurized air from conduits 44 and 140 will communicate with conduit 142, check valve 134, and air relay valve 116.

The magnitude of the control signal, or fluid pressure, which is effective to energize the servomotors may be adjusted by selecting the spring 119 with any desired spring rate. For the directional-motion servomotors 88 and 96 proper adjustment in this manner will serve to operate control system 10 upon vehicle movement above a predetermined speed.

Air relay valve 116 comprises a valve spool 144 spring biased to its closed position within chamber 146 and urged to its open position responsive to pressurized air from check valve 134. This pressurized air will operate valve spool 144 so that air will communicate from branch conduits 44 and 148 to conduit 150, branch conduit 152, pressure reducing valve 154, check valve 52, and brake cluster 56. Brake cluster 56 in turn will operate to apply the brakes. At the same time pressurized air in conduit 152 will communicate with conduit 36 for operation of transmission disconnect mechanism 38 to automatically shift the transmission into neutral.

It is apparent from the foregoing description that automatic operation of the brakes and transmission disconnect is effective only when the transmission control lever is manipulated to shift the transmission into a directional condition opposite from that in which the vehicle is moving. This can only occur when the control signals from the vehicle direction-motion pump 68 and transmission shift condition valve 103 are effective simultaneously to energize either of the pair of servomotors 96, 110 or 88, 114. In any other condition of vehicle operation control system 110 will not operate so that normal vehicle handling may be effective. For example, assume that the vehicle is moving forward so that a forward motion control signal, or hydraulic pressure in conduit 82, will energize servomotor 88 to open valve chamber 138. If control lever 22 is shifted to the forward position at this time a forward shift control signal, or hydraulic pressure in conduit 108, will energize servomotor 110 to open valve chamber 124. However, servomotors 96 and 114 will remain deenergized so that valve chambers 130 and 136 will remain closed. Thus no air pressure can be delivered to air relay valve 116 so that valve spool 144 will remain in the closed position with the result that automatic braking and transmission disconnecting will not be initiated.

Control system 10 is designed to automatically apply the brakes and disconnect the transmission to stop the vehicle in the same length of time that an operator would use under normal conditions. The operator can override the control system through manipulation of pedal 48 so that the vehicle brakes will be applied faster as desired. However, the operator can not stop or slow down the vehicle by using the transmission as is the present practice. The control system thus will substantially increase transmission clutch life and reduce shifting shocks in the transmission and drive train.

What is claimed is:

1. The method of controlling a vehicle having a transmission selectively operable from a neutral condition to forward and reverse shift conditions to drivingly connect traction wheels with an engine to move the vehicle in respective forward and reverse directions, first means to brake the vehicle, and second means to disconnect drive through the transmission when in said forward and reverse shift conditions, the method comprising the steps of: producing first and second control signals responsive respectively to forward and reverse shift conditions; producing third and fourth control signals responsive to movement of the vehicle in respective forward and reverse directions; and, operating the first means to brake the vehicle and operating the second means to disconnect the transmission, both operations responsive automatically to either simultaneous first and fourth control signals or simultaneous second and third control signals.

2. The method of claim 1 wherein the third and fourth control signals are produced responsive to movement of the vehicle in the respective direction above a predetermined speed.

3. The method of claim 1 wherein the third and fourth control signals are produced with a magnitude proportional to vehicle speed.

4. The method of claim 3 wherein operation of the first and second means is responsive to either a simultaneous first signal and predetermined magnitude of the fourth signal or a simultaneous second signal and predetermined magnitude of the third signal.

5. The method of claim 3 and further comprising the step of operating the first and second means to release the brake and connect the transmission responsive to decay of the third or fourth control signals below a predetermined magnitude.

References Cited

UNITED STATES PATENTS

| | | |
|---|---|---|
| 2,176,897 | 10/1939 | Fodor. |
| 3,003,606 | 10/1961 | Hindmarch. |
| 3,132,729 | 5/1964 | Garland. |
| 3,332,298 | 7/1967 | Smith. |
| 3,348,644 | 10/1967 | Hilpert. |

BENJAMIN W. WYCHE III, *Primary Examiner.*

U.S. Cl. X.R.

192—13; 303—13